(12) United States Patent
Nedorezov

(10) Patent No.: US 7,761,202 B2
(45) Date of Patent: Jul. 20, 2010

(54) INDICATING A LOW VOLUME OF FLUID IN A TRANSMISSION SUMP

(75) Inventor: Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 11/971,981

(22) Filed: Jan. 10, 2008

(65) Prior Publication Data

US 2009/0182467 A1 Jul. 16, 2009

(51) Int. Cl.
*G01M 17/00* (2006.01)
(52) U.S. Cl. .................. 701/30; 701/103; 701/104; 701/123; 73/290 R
(58) Field of Classification Search .......... 701/29, 701/30, 103, 104, 123; 73/290 R
See application file for complete search history.

(56) References Cited

U.S. PATENT DOCUMENTS

| | | | |
|---|---|---|---|
| 4,476,714 A | 10/1984 | Barry et al. | |
| 4,745,893 A | 5/1988 | Atherton et al. | |
| 5,121,340 A * | 6/1992 | Campbell et al. | 702/54 |
| 5,146,785 A | 9/1992 | Riley | |
| 6,195,013 B1 | 2/2001 | Robinson | |
| 6,427,532 B1 * | 8/2002 | Keller | 73/290 V |
| 6,993,967 B2 | 2/2006 | Forgue | |
| 7,117,739 B2 * | 10/2006 | Atkinson | 73/290 V |
| 7,222,528 B2 | 5/2007 | Stahlmann et al. | |
| 7,249,507 B2 | 7/2007 | Weedon | |
| 7,421,895 B1 * | 9/2008 | Caldwell | 73/290 V |

FOREIGN PATENT DOCUMENTS

| | | |
|---|---|---|
| WO | WO2005057138 | 6/2006 |
| WO | WO2006084069 | 8/2006 |
| WO | WO2007098455 | 8/2007 |

* cited by examiner

*Primary Examiner*—Gertrude Arthur Jeanglaud
(74) *Attorney, Agent, or Firm*—David B. Kelly; MacMillan, Sobanski & Todd, LLC

(57) ABSTRACT

A method for sensing a volume of fluid located in an oil sump of a motor vehicle transmission includes repetitively determining a rate of change of a temperature of the oil, repetitively determining an acceleration of the vehicle, counting the number of occurrences in which vehicle acceleration is greater than a reference acceleration and the rate of change of oil temperature is greater than a reference rate of change of temperature, and producing an indication that the volume of fluid is low, if the number is greater than a reference number.

13 Claims, 4 Drawing Sheets

INDICATING A LOW VOLUME OF FLUID IN A TRANSMISSION SUMP

BACKGROUND OF THE INVENTION

1. Field of the Invention

This invention relates generally to a transmission for a motor vehicle containing a sump for containing fluid, and, more particularly, to a method and system for indication that the fluid volume is low.

2. Description of the Prior Art

In many modern transmissions, because of cost and packaging constraints, a dip-stick for examining the level of transmission fluid is either not available or requires that the vehicle to be hoisted in order to check the transmission fluid level. In some production transmissions a small dip stick is provided under the vehicle but in close proximity to engine exhaust gas components, whose operating temperature is high. This location makes checking the transmission fluid level difficult and limits its execution to trained service personnel.

The lack of readily available access to check regularly the transmission fluid level can lead to the vehicle being driven with a low transmission level. Prolonged use with a low transmission level can result in poor shift quality transmission damage and eventual costly repairs.

Oil level detectors add cost and complexity to the system and also have limited application range.

SUMMARY OF THE INVENTION

A method for sensing a volume of fluid located in an oil sump of a motor vehicle transmission includes repetitively determining a rate of change of a temperature of the oil, repetitively determining an acceleration of the vehicle, counting the number of occurrences in which said acceleration is greater than a reference acceleration and said rate of change of the temperature is greater than a reference rate of change of temperature, and producing an indication that the volume of fluid is low, if said number is greater than a reference number.

An existing transmission oil temperature (TOT) sensor, located in the oil sump of the transmission hydraulic system, is used to detect a low transmission fluid volume condition.

The TOT sensor, a thermistor that changes its electrical resistance as the temperature of the transmission fluid changes, is submerged in oil when vehicle is driven with an adequate transmission fluid volume. The oil temperature is correlated with a vehicle speed signal. If oil volume is sufficient the variations of the TOT are in a relatively narrow range. But the variations become high if the oil volume is low because the sensor becomes exposed to the air for extended periods during vehicle acceleration.

A controller monitors vehicle speed and continuously calculates vehicle acceleration. Simultaneously controller monitors the oil temperature. When acceleration exceeds calibrated reference level during predefined time period controller will calculate amplitude of the oil level change during the same time period. This amplitude is compared to a calibrated reference level. When the amplitude of the temperature signal change exceeds a calibrated level, such occurrences are counted. When the number of these events exceeds a calibratable reference number within predefined period, warning signal alerts the vehicle operator that the oil volume is insufficient.

Sensitivity of the system can be adjusted by calibrating vehicle acceleration reference variables as vehicle speed changes. In addition sensitivity and noise immunity of the system can be adjusted by calibrating a frequency of occurrences that would set or reset a fault counter of events when TOT variation is greater than a reference.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
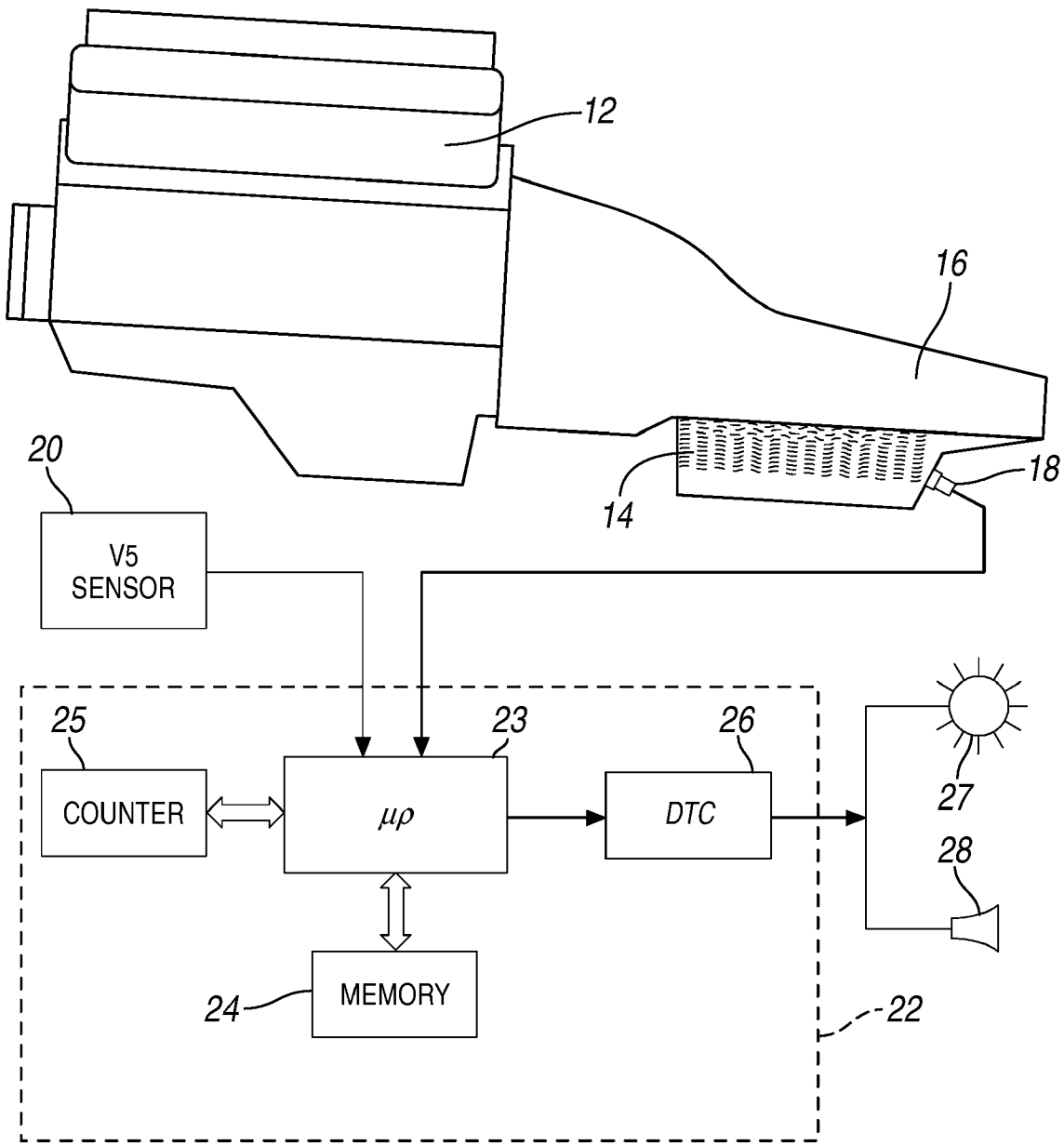
FIG. 1 is a schematic diagram showing a system for alerting a vehicle operator that the volume of transmission fluid in an oil sump is insufficient.

Referring now to the drawings, there is illustrated in FIG. 1 a system for alerting a vehicle operator that the volume of transmission fluid in a transmission oil sump is insufficient. The system includes an engine block 12 and a transmission oil pan or oil sump 14, which is secured to the bottom of a transmission case 16 and contains a volume of transmission fluid. An electronic signal produced by a transmission oil temperature (TOT) sensor 18 represents the temperature of oil in the oil sump 14. The TOT sensor 18, preferably a thermistor that changes its electrical resistance as the temperature of the transmission fluid changes, is normally submerged in the oil located in sump 14 when the volume of oil in the oil in the sump is within a normal volume range.

As the vehicle moves, oil pitches, rolls, sways and splashes about in the sump 14, affecting the signal produced by TOT sensor 18, especially if the oil volume in sump 14 is low. If the oil volume is within a normal volume range, the temperature indicated by TOT sensor 18 is well correlated with a vehicle speed (VS) signal produced by a speed sensor 20. For example, if the oil volume is within a normal range, the variation of the TOT is in the range of 3-6° F. However, this variation become significantly higher (10-25° F.) if the oil volume is less than the normal range because sensor 18 becomes exposed to air for extended periods due to oil movement in the sump 14.

An electronic controller 22, such as a Transmission Control Module (TCM) containing a microprocessor 23 and electronic memory 24 accessible to microprocessor 23 and containing a control algorithm 40, monitors vehicle speed and TOT at frequent intervals, repetitively executes the algorithm, and compares changes in TOT to changes in vehicle speed.

Each occurrence of the amplitude of the change in TOT exceeding a calibrated, reference temperature change is counted in a fault counter 25. When the number of such occurrences exceeds a calibratable, reference count, within defined period, a Diagnostic Trouble Code (DTC) 26 is set in controller 22. Setting the DTC, causes a warning light 27 to light, or a buzzer 28 to sound, or another sensible warning to occur, which alerts the vehicle operator that the volume of oil in the transmission oil sump 14 is insufficient.

Sensitivity of the system can be adjusted by calibrating reference magnitudes of the TOT signal variation as the function of vehicle speed changes. In addition sensitivity and noise immunity of the system can be adjusted by calibrating a frequency reference that sets and resets the fault counter 25 when TOT variation is greater or less than the reference.

Figure 2:
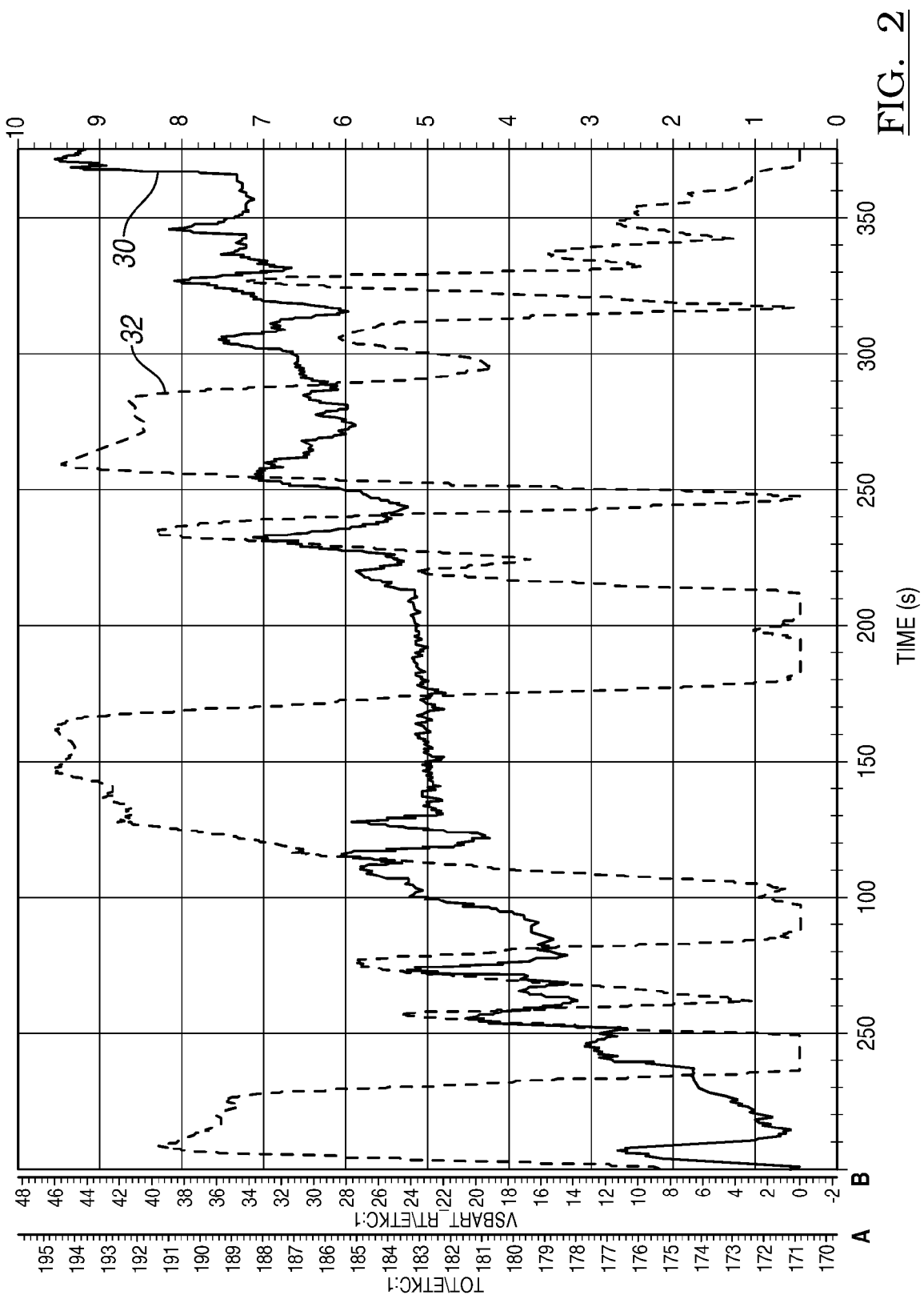
FIG. 2 is a graph that illustrating empirical data of oil temperature and vehicle speed vs. time in a vehicle whose transmission oil sump contains a normal range of volume.

FIG. 2 illustrates empirical data of the transmission oil temperature sensor (TOT) reading and vehicle speed (VSBART_RT) vs. time in a vehicle with the transmission oil sump filled to a normal level range. While average TOT signal signal 30 reflects a generally increasing transmission fluid temperature, the higher frequency component of signal 30 correlates with changes of the road speed signal 32. Depending on the location of the TOT sensor, the wave caused by vehicle acceleration can cause higher or lower temperature changes. Generally TOT increases when positive vehicle acceleration occurs and decreases TOT when negative vehicle acceleration occurs.

Figure 3:
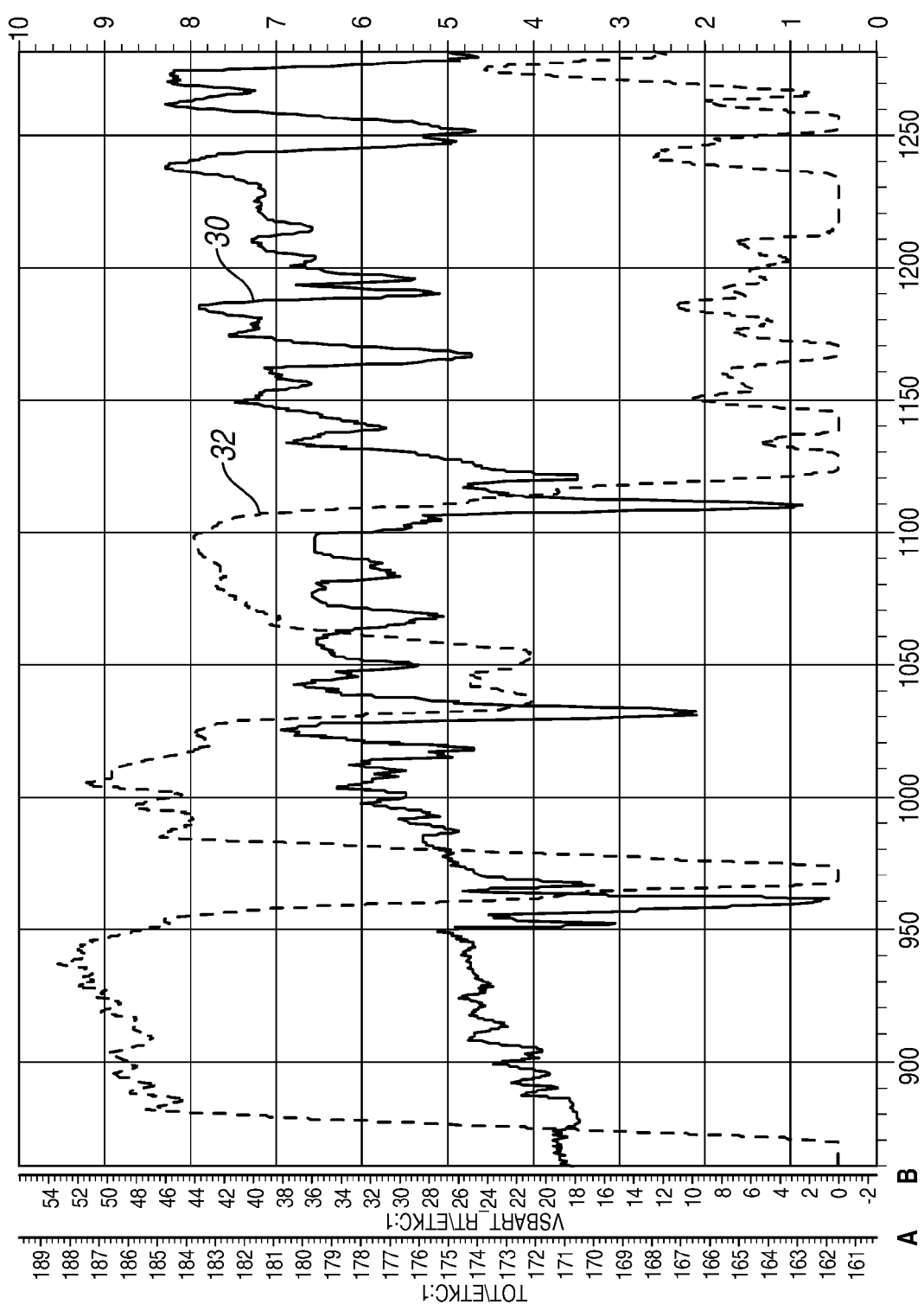
FIG. 3 is a graph that illustrates empirical data of TOT and vehicle speed vs. time in a vehicle whose transmission oil sump contains less than the normal range of volume.

FIG. 3 illustrates empirical data of the transmission oil temperature sensor (TOT) reading and vehicle speed (VSBART_RT) vs. time in a vehicle whose transmission oil sump contains one quart less than the filled volume of transmission fluid. The same correlation can be observed between TOT and VSBART as in FIG. 1 except that the amplitude of the variations is significantly greater.

A comparison of experimental data shows that the most pronounced difference in TOT readings when the volume of transmission fluid in the oil sump is lower than the normal volume coincides with vehicle deceleration. Thus one possible embodiment of a detection algorithm detects application of the vehicle wheel brakes, calculates the vehicle deceleration, and compares vehicle deceleration to a calibratable reference vehicle deceleration. If the reference vehicle deceleration is exceeded, then changes in TOT during the same time period are examined. If TOT changes exceed a preset reference temperature change, a fault counter is incremented.

If the reference temperature change is not exceeded and the counter contains a value greater than zero, the counter is decremented. If the counter value exceeds a reference limit count within a predetermined period length or over a predefined vehicle driving distance, a diagnostic trouble code is set for low transmission fluid.

Figure 4:
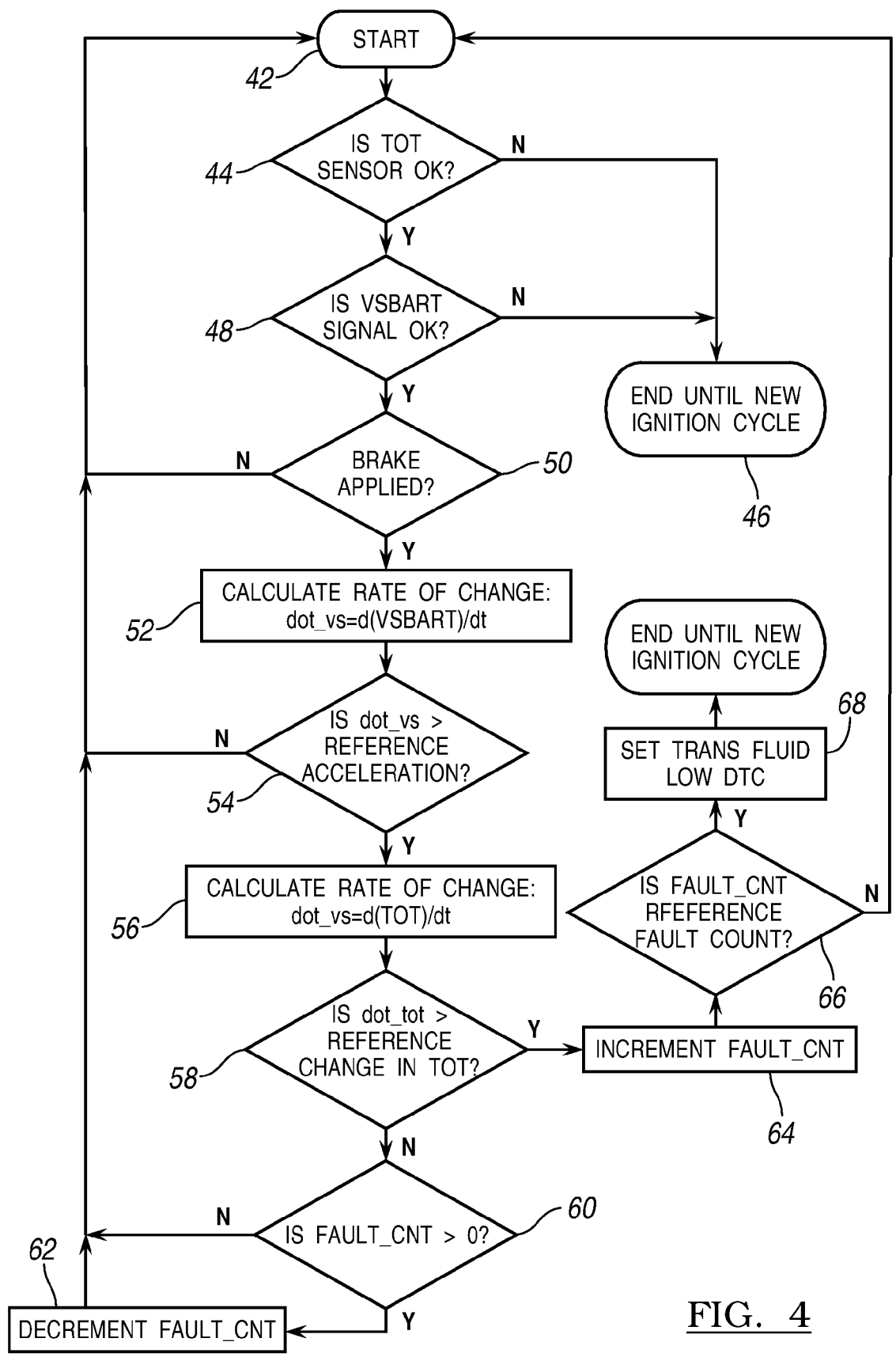
FIG. 4 is flow diagram showing the steps of a control method.

FIG. 4 illustrates a control logic flow chart representing an algorithm 40 that produces a warning of insufficient fluid volume in the transmission oil sump.

After execution of the algorithm 40 begins at step 42, a test is made at step 44 to determine whether the TOT sensor 18 is operating correctly. If the result of test 44 is logically false, control passes to 46 where the algorithm is exited.

If the result of test 44 is logically true, control passes to step 48, where a test is made to determine whether the vehicle speed signal is being produced correctly. If the result of test 48 is logically false, control passes to 46 where the algorithm is exited.

If the result of both tests 44 and 48 is true, at step 50 a test is made to determine whether the wheel brakes of the vehicle are applied. If the result of test 50 is false, control returns to 42 where the algorithm is initialized and reentered.

If the result of test 50 is true, control passes to step 52, where the current vehicle acceleration is determined by dividing the difference in vehicle speed at two intervals by the length of the period between the sampling intervals. Preferably the algorithm 40 is executed repetitively at frequent intervals of about 10 msec, although the vehicle acceleration can be determined between any of the execution intervals, which need not be immediately successive.

A test is made at step 54 to determine whether the vehicle acceleration determined from step 52 is greater than a reference vehicle acceleration, which is a calibratable acceleration stored in electronic memory accessible to a controller 22. If the result of test 54 is false, control returns to 42 where the algorithm is initialized and reentered.

If the result of test 54 is true, at step 56, the current rate of change of TOT is determined by dividing the difference in TOT at two intervals by the length of the period between those intervals.

A test is made at step 58 to determine whether the rate of change of TOT determined from step 56 is greater than a reference rate of change of TOT, which is a calibratable rate of change stored in electronic memory accessible to the controller 22.

If the result of test 58 is false, at step 60 a test is made to determine whether the fault count is greater than zero. If the result of test 60 is false, control returns to 42 where the algorithm is initialized and reentered. If the result of test 60 is true, indicating that the fault count is greater than zero, the fault counter 25 is decremented at step 62 and control returns to 42 where the algorithm is initialized and reentered.

If the result of test 58 is true, at step 64 the fault counter 25 is incremented. A test is made at step 66 to determine whether the current fault count is greater than a reference fault count, which is a calibratable count stored in electronic memory accessible to the controller 22. If the result of test 66 is false, control returns to 42 where the algorithm is initialized and reentered.

If the result of test 66 is true, indicating that an excessive number of high rate of changes of TOT have occurred while vehicle acceleration is greater than the reference acceleration, at step 68 the controller 22 issues a command signal that causes a sensory signal to the vehicle operator indicating that the volume of transmission fluid in the transmission oil sump is low and should be checked or fluid should be added to the sump.

In accordance with the provisions of the patent statutes, the preferred embodiment has been described. However, it should be noted that the alternate embodiments can be practiced otherwise than as specifically illustrated and described.

The invention claimed is:

1. A method for sensing a volume of fluid located in an oil sump of a motor vehicle transmission, comprising:
    (a) repetitively determining a rate of change of a temperature of the oil;
    (b) repetitively determining an acceleration of the vehicle;
    (c) counting the number of occurrences in which said acceleration is greater than a reference acceleration and said rate of change of the temperature is greater than a reference rate of change of temperature; and
    (d) if said number is greater than a reference number, producing an indication that the volume of fluid is low.

2. The method of claim 1 wherein step (b) further comprising the step of applying a brake that decelerates the vehicle.

3. The method of claim 1 wherein step (a) further comprising the steps of:
    repetitively determining at frequent intervals a temperature of the oil;
    determining a difference in the oil temperature during a predetermined period between two of the intervals;
    dividing the oil temperature difference by the length of the period.

4. The method of claim 1 wherein step (b) further comprising the steps of:
   repetitively determining at frequent intervals a speed of the vehicle;
   determining a difference in the vehicle speed during a predetermined period between two of the intervals;
   dividing said difference in vehicle speed by the length of the period.

5. The method of claim 1 further comprising decrementing said number of occurrences if said acceleration is greater than the reference acceleration and said rate of change of the temperature is less than the reference rate of change of temperature.

6. A method for sensing a volume of fluid located in an oil sump of a motor vehicle transmission, comprising:
   (a) repetitively determining a rate of change of a temperature of the oil;
   (b) repetitively determining an acceleration of the vehicle;
   (c) counting the number of occurrences in which said acceleration is greater than a reference acceleration and said rate of change of the temperature is greater than a reference rate of change of temperature;
   (d) decrementing said number of occurrences if said acceleration is greater than the reference acceleration and said rate of change of the temperature is less than the reference rate of change of temperature, and
   (e) indicating that the volume of fluid is low, if said number of occurrences is greater than a reference number.

7. The method of claim 6 wherein step (b) further comprising the step of applying a brake that decelerates the vehicle.

8. The method of claim 6 wherein step (a) further comprising the steps of:
   repetitively determining at frequent intervals a temperature of the oil;
   determining a difference in the oil temperature during a predetermined period between two of the intervals;
   dividing the oil temperature difference by the length of the period.

9. The method of claim 6 wherein step (b) further comprising the steps of:
   repetitively determining at frequent intervals a speed of the vehicle;
   determining a difference in the vehicle speed during a predetermined period between two of the intervals;
   dividing said difference in vehicle speed by the length of the period.

10. A system for warning that a volume of fluid located in an oil sump of a motor vehicle transmission is low comprising:
    a first sensor producing a signal representing a speed of the vehicle;
    a second sensor producing a signal representing a temperature of the oil;
    a controller communicating with the first and second sensors and configured to determine repetitively a rate of change of a temperature of the oil, to determine repetitively an acceleration of the vehicle, to counting the number of occurrences in which said acceleration is greater than a reference acceleration and said rate of change of the temperature is greater than a reference rate of change of temperature, and to producing an indication that the volume of fluid is low if said number is greater than a reference number.

11. The system of claim 10 wherein the controller is further configured to repetitively determine at frequent intervals a temperature of the oil, to determine a difference in the oil temperature during a predetermined period between two of the intervals, and to divide the oil temperature difference by the length of the period.

12. The system of claim 10 wherein the controller is further configured to repetitively determine at frequent intervals a speed of the vehicle, to determine a difference in the vehicle speed during a predetermined period between two of the intervals, and to divide said vehicle speed difference by the length of the period.

13. The system of claim 10 wherein the controller is further configured to decrement said number of occurrences if said acceleration is greater than the reference acceleration and said rate of change of the temperature is less than the reference rate of change of temperature.

* * * * *